Patented Jan. 16, 1951

UNITED STATES PATENT OFFICE 2,538,126

PREPARATION OF PENICILLENATE ESTERS

Edward F. Rogers, Middletown, and Richard F. Phillips, Westfield, N. J., Clifford H. Shunk, Madison, Wis., Frank R. Koniuszy, Rahway, and Karl Folkers, Plainfield, N. J., assignors to Merck & Co., Inc., Rahway, N. J., a corporation of New Jersey No Drawing. Application August 6, 1946, Serial No. 688,692

6 Claims. (Cl. 260—307)

This invention relates to penicillenate esters and more particularly to procedures by which these esters and other chemically related substances can be prepared.

The penicillenate esters forming the subject matter of the present invention can be represented by the formula:

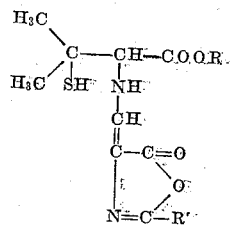

wherein R represents lower alkyl substituents and R' represents phenyl, benzyl, n-amyl and styryl substituents. The forms of penicillenate are of similar structure and differ only in that R' represents various substituents.

The penicillenate esters with which our invention is concerned are useful intermediates in the synthesis of compounds possessing activity similar to penicillin.

A compound of the above general structure wherein R' is a benzyl group (—CH₂—C₆H₅) is fully defined by the chemical name N-(2-benzyl-5-oxo-4(5)-oxazolidenemethyl)-d-penicillamine alkyl ester and will hereinafter be referred to as an alkyl ester of penicillenate G.

A compound of the above formula wherein R' is n-amyl is fully defined by the chemical name N-(2-amyl-5-oxo-4(5)-oxazolylidenemethyl)-penicillamine alkyl ester and will be referred to hereinafter as an alkyl ester of dihydropenicillenate F.

It has now been discovered in accordance with the present invention that these new compounds can be prepared by condensing an alkyl ester of α-amino-β-mercapto-isovaleric acid (penicillamine ester) with a 4-alkoxymethylene-5(4)-oxazolone having a suitable monovalent organic radical in the 2-position. This reaction as applied to the production of penicillenate compounds is indicated graphically as follows:

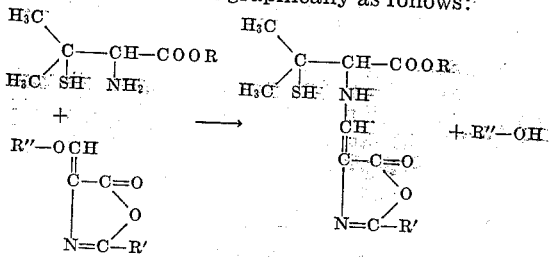

wherein R and R' are as above and R'' represents hydrogen and alkyl substituents.

d-Penicillamine is formed upon treatment of pencillin with dilute mineral acid and can also be prepared synthetically from dl-valine through a new intermediate 2-methyl-4-isopropylidene-5(4)-oxazolone and racemic dl-pencillamine by a procedure fully disclosed in copending joint application to one of us, Mozingo, Folkers and Easton, Serial No. 656,511, filed March 22, 1946, now U. S. Patent 2,515,465; and Sheehan and Tishler, Serial No. 656,513, filed March 22, 1946.

The other starting material 2-benzyl-4-alkoxymethylene-5(4)-oxazolone can be prepared from the methyl ester of α-formyl-α-phenacetamidoacetic acid by procedures fully described in a copending joint application to one of us, Harris, Arth, Hoffman and Folkers, Serial No. 636,516, filed December 21, 1945, now U. S. Patent No. 2,489,881 patented November 29, 1949.

In carrying out the process of the present invention a penicillamine ester, either the racemate or d-isomer, is condensed with a 2-benzyl-4-alkoxymethylene-5(4)-oxazolone in the presence of an organic solvent such as toluene, benzene, dioxan and the like. The condensation proceeds rapidly and the reaction mixture can be concentrated to dryness at room temperature. It is also possible to reflux the mixture and then concentrate to dryness in vacuo.

It should be noted that 2-benzyl-4-hydroxymethylene can be employed in place of 2-benzyl-4-alkoxymethylene-5(4)-oxazolone.

The following examples illustrate methods of carrying out the present invention, but it is to be understood that these examples are given by way of illustration and not of limitation.

Example 1

881 mg. of d-penicillamine methyl ester was added to 1.07 g. of 2-benzyl-4-hydroxymethylene-5(4)-oxazolone dissolved in 30 ml. of dry toluene. This mixture was refluxed for 12 minutes, then concentrated to dryness in vacuo. A heavy yellow gum, methyl d-penicillenate G, i. e. N-(2-benzyl-5-oxo-4(5)-oxazolidenemethyl)-d-penicillamine methyl ester, having an optical rotation of $(\alpha)_D^{26} = +35.7$ (c, 33 mg./10 ml. methanol) was obtained.

Example 2

1.78 g. of d-penicillamine methyl ester was dissolved in 30 ml. of dry toluene and 2.1 g. of 2-benzyl-4-methoxymethylene-5(4)-oxazolone was added. The solution was distilled slowly until 12 ml. of toluene had been removed. The remainder of the toluene was removed in vacuo and the residue was dried in high vacuum for 3 hours. The yellow tacky gum, methyl d-penicillenate G, i. e. N-(2-benzyl-5-oxo-4(5)-oxazolylidenemethyl)-d-penicillamine methyl ester, had an optical rotation of $(\alpha)_D^{25} = +37.6$ when measured in methanol.

Example 3

A solution of 1.00 g. of d-penicillamine methyl ester and 1.33 g. 2-benzyl-4-methoxymethylene-5(4)-oxazolone in 25 ml. of toluene was concentrated to dryness at room temperature immediately after preparation. The concentration required approximately 15 minutes. The residual gum was dissolved in 50 ml. of chloroform and washed with three 30 ml. volumes of 0.2 M pH 7 phosphate buffer. The chloroform layer was filtered and evaporated to dryness, yielding a straw-colored gum which became yellow on standing. This product, methyl-d-penicillenate G, i. e. N - (2 - benzyl - 5 - oxo - 4(5) - oxazolylidenemethyl) - d - penicillamine methyl ester, had an optical rotation of $(a)_D^{25} = 40.0°$ when measured in a 0.5% benzene solution. In alcohol solution, the product shows ultraviolet absorption at 3175 Å, $E_m = 18,000$.

Anal. Calcd. for $C_{17}H_{20}O_4N_2S$; C, 58.60; H, 5.79; N, 8.04.
Found: C, 58.08; H, 5.87; N, 8.24.

Example 4

To 0.96 g. of 2-benzyl-4-methoxymethylene-5(4)-oxazolone dissolved in 50 ml. of benzene was added 0.72 g. (theoretical amount) of d-penicillamine methyl ester. This solution was concentrated at 30-35° C. in vacuo to yield a pale yellow gum. This gum was redissolved in about 50 ml. of benzene, washed with 25 ml. of 0.2 M phosphate buffer of pH 7 and then twice with 25 ml. portions of water. The filtered solution was concentrated to a gum and pumped in vacuo at 1 mm. The ultraviolet absorption maximum for this methyl-d-penicillenate G, i. e. N-(2-benzyl-5 - oxo - 4(5) - oxazolylidenemethyl) - d - penicillamine methyl ester, in n-propyl ether was found to be $E_m$ 14250 at 3150 Å.

Example 5

1.087 g. of d-penicillamine methyl ester and 1.45 g. of 2-phenyl-4-ethoxymethylene-5(4)-oxazolone were heated in 20 ml. of refluxing toluene for 15 minutes. After removal of solvent in vacuo, the residue was crystallized from ether. This residue, methyl d-norPenicillenate G, i. e. N - (2 - phenyl - 5 - oxo - 4(5) - oxazolylidenemethyl)-d-penicillamine methyl ester, had a melting point of 107-109° C. After recrystallization from ether the compound melted at about 110-111° C. and had an optical rotation of $(a)_D^{24} = +99.1°$ when measured in 1% methanol.

Anal. Calcd. for $C_{16}H_{18}O_4SN_2$: C, 57.33; H, 5.43; N, 8.38.
Found: C, 57.55; H, 5.21; N, 8.72.

Example 6

216 mg. of dl-penicillamine methyl ester were added to 288 mg. of 2-phenyl-4-ethoxymethylene-5(4)-oxazolone and the mixture heated in 5 ml. of refluxing toluene for 15 minutes. During refluxing approximately 2 ml. of liquid was run off. After reaction the solvent was removed in vacuo. The residue, methyl dl-norPenicillenate G, i. e. N - (2 - phenyl - 5 - oxo - 4(5) - oxazolylidenemethyl)-dl-penicillamine methyl ester, was crystallized from ether and had a melting point of about 118-120° C.

Anal. Calcd. for $C_{16}H_{18}O_4SN_2$: C, 57.33; H, 5.43; N, 8.38.
Found: C, 57.47; H, 5.48; N, 8.40. C, 57.65; H, 5.58.

Example 7

To 1 g. of 2-phenyl-4-hydroxymethylene-5(4)-oxazolone in 30 ml. of dry toluene was added 1.1 g. of dl-penicillamine methyl ester. A reddish color slowly formed. The solution was refluxed for 10 minutes and the color changed to orange. This mixture was concentrated to dryness in vacuo to yield a red brittle residue of methyl dl-norPenicillenate G, i. e. N-(2-phenyl-5-oxo-4(5) oxazolylidenemethyl)-dl-penicillamine methyl ester.

Example 8

A solution of 6.42 g. of 2-n-amyl-4-methoxymethylene-5(4)-oxazolone in 100 ml. of benzene was mixed with 4.92 g. of d-penicillamine methyl ester. Evaporation of the solvent resulted in a light yellow oil which was dissolved in ether and seeded with crystalline material obtained previously. The first crop of methyl d-Dihydropenicillenate F, i. e. N-(2-amyl-5-oxo-4(5)-oxazolylidenemethyl)-penicillamine methyl ester, crystals melted at 103-105° C.; the second crop of crystals melted at 96-102° C.

On recrystallization from acetone-ether, the substance melted at 105-106° C. and had an optical rotation of $(a)_D^{26} + 71.1°$ (c, 2.18 in methanol).

Example 9

A mixture of 1.360 g. of 2-styryl-4-ethoxymethylene-5(4)-oxazolone and 919 mg. of dl-penicillamine methyl ester in 20 ml. toluene was evaporated to dryness at room temperature in the course of fifteen minutes. The amorphous powder N - (2 - (ω - styryl) - 5 - oxo - 4(5) - oxazolylidenemethyl)-dl-penicillamine methyl ester was crystallized from ether and had a melting point of about 158-159° C.

Anal. Calcd. for $C_{18}H_{20}O_4SN_2$: C, 60.00; H, 5.60; N, 7.78.
Found: C, 60.33; H, 5.78; N, 7.95.

Example 10

A mixture of 4.000 g. of 2-styryl-4-ethoxymethylene-5(4)-oxazolone and 2.750 g. of d-penicillamine methyl ester in 40 ml. of toluene was evaporated to dryness at room temperature during an interval of twenty minutes. The amorphous powder N-(2-(ω-styryl)-5-oxo-4(5)-oxazolylidenemethyl)-d-penicillamine methyl ester secured was crystallized from ether, and had a melting point of 137-138° C.

Anal. Calcd. for $C_{18}H_{20}O_4SH_2$: N, 7.78.
Found: N, 7.80.

Various changes and modifications may be made in our process, certain preferred embodiments of which are described herein, which changes and modifications would, nevertheless, be within the scope of our invention. It is our intention that such changes and modifications, to the extent that they are within the scope of the appended claims, shall be considered as part of our invention.

We claim:
1. The process for preparing penicillenate esters that comprises condensing equimolecular quantities of penicillamine ester with a compound represented by the formula

$$\begin{array}{c} R''OCH \\ \| \\ C-C=O \\ | \quad \diagdown \\ \quad \quad O \\ | \quad \diagup \\ N=C-R' \end{array}$$

wherein R'' is selected from the class consisting of hydrogen and alkyl substituents and R' is selected from the class consisting of phenyl, benzyl and n-amyl substituents in the presence of an organic solvent selected from the class consisting of benzene and toluene, removing the liquid formed during the reaction, and recovering the penicillenate ester formed.

2. The process that comprises condensing equimolecular quantities of d-penicillamine methyl ester with 2-benzyl-4-hydroxymethylene-5(4)-oxazolone in the presence of toluene removing the water formed during the reaction and recovering N(2-benzyl-5-oxo-4(5)-oxazolylidenemethyl)-d-penicillamine methyl ester.

3. The process that comprises condensing equimolecular quantities of d-penicillamine methyl ester with 2-benzyl-4-methoxymethylene-5(4)-oxazolone in the presence of toluene removing the alcohol formed during the reaction and recovering N(2-benzyl-5-oxo-4(5)-oxazolylidenemethyl)-d-penicillamine methyl ester.

4. The process that comprises condensing equimolecular quantities of d-penicillamine methyl ester with 2-phenyl-4-ethoxymethylene-5(4)-oxazolone in the presence of toluene removing the alcohol formed during the reaction and recovering N(2-phenyl-5-oxo-4(5)-oxazolylidenemethyl)-d-penicillamine methyl ester.

5. The process that comprises condensing equimolecular quantities of dl-penicillamine methyl ester with 2-phenyl-4-hydroxymethylene-5(4)-oxazolone in the presence of toluene, removing the water formed during the reaction and recovering N(2-phenyl-5-oxo-4(5)oxazolylidenemethyl)-dl-penicillamine methyl ester.

6. The process that comprises condensing equimolecular quantities of d-penicillamine methyl ester with 2-n-amyl-4-methoxymethylene-5(4)-oxazolone in the presence of benzene removing the alcohol formed during the reaction and recovering N(2-amyl-5-oxo-4(5)-oxazolylidenemethyl)-penicillamine methyl ester.

EDWARD F. ROGERS.
RICHARD F. PHILLIPS.
CLIFFORD H. SHUNK.
FRANK R. KONIUSZY.
KARL FOLKERS.

REFERENCES CITED

The following references are of record in the file of this patent:

UNITED STATES PATENTS

| Number | Name | Date |
|---|---|---|
| 2,480,466 | Harris et al. | Aug. 30, 1949 |
| 2,494,745 | Cook et al. | Jan. 17, 1950 |
| 2,505,834 | Peck | May 2, 1950 |

OTHER REFERENCES

Merck Report M-12a, February 29, 1944, page 17.

Merck Report M-15c, March 31, 1944, pp. 21, 22 and 23.

Michigan Report B-3, April 1, 1944, pp. 1, 2, and 3.

Merck Report M-37, July 31, 1944, page 23.

Merck Report M-47, October 31, 1944, page 3.